United States Patent

Colling

Patent Number: 5,363,025
Date of Patent: Nov. 8, 1994

[54] ACTUATOR EMPLOYING UNIDIRECTIONAL MOTOR FOR BIDIRECTIONAL ROTATIONAL POSITIONING

[75] Inventor: George J. Colling, Jordan, Minn.

[73] Assignee: Honeywell Inc., Minneapolis, Minn.

[21] Appl. No.: 998,201

[22] Filed: Dec. 30, 1992

[51] Int. Cl.$^5$ .................. F23C 11/00; G05D 23/00
[52] U.S. Cl. .................. 318/468; 318/634; 318/641; 431/20; 236/1 G; 236/93 R
[58] Field of Search .............. 318/471, 468, 160, 762, 318/135, 640, 641, 634; 236/1 G, 93 R, 45, 11, 21 B, 91, 93 A, 99 G; 431/20, 21

[56] References Cited

U.S. PATENT DOCUMENTS

| | | | |
|---|---|---|---|
| 4,071,190 | 1/1978 | Ford, Jr. | 236/93 A |
| 4,205,783 | 6/1980 | Dietsche et al. | 236/1 G |
| 4,225,080 | 9/1980 | Barth | 431/20 |
| 4,251,024 | 2/1981 | Feinberg | 431/21 |
| 4,265,394 | 5/1981 | Nagel | 236/1 G |
| 4,462,539 | 7/1984 | Gilson | 318/160 |

OTHER PUBLICATIONS

D80B, D Automatic Vent Damper, Honeywell Inc. Product Manual, Nov. 1992.

Primary Examiner—William M. Shoop, Jr.
Assistant Examiner—John Cabeca
Attorney, Agent, or Firm—Charles L. Rubow

[57] ABSTRACT

An actuator employing a unidirectional electric motor driving a first rotating member connected to a second rotating member through a pivotable link of which a first end is connected to the first rotating member at a smaller distance from its axis of rotation than the distance between the point at which the second end is connected to the second rotating member and its axis of rotation. An enegerization circuit includes first and second limit switches through which the motor is alternately energized to rotate the second men%her in opposite directions to first and second limiting positions respectively.

7 Claims, 3 Drawing Sheets

ACTUATOR EMPLOYING UNIDIRECTIONAL MOTOR FOR BIDIRECTIONAL ROTATIONAL POSITIONING

BACKGROUND OF THE INVENTION

The invention disclosed herein relates generally to actuators for rotational positioning of a member, and more particularly to an actuator design capable of employing a unidirectional motor to alternately position a rotating member against first and second fixed stops.

In certain actuator applications, such as for positioning closure members in fluid flow control devices, it is necessary or desirable to be able to alternately rotate the closure member to positions angularly separated by 90 degrees. It is further desirable to be able to accomplish this positioning with a unidirectional motor for which the power supply and control circuitry are generally simpler and less expensive than for a bidirectional motor. Further, in some applications, such as in automatic flue damper apparatus having a sheet metal flue section with a closure disk therein, it may be necessary or desirable to firmly position the closure disk against a fixed perimeter stop or seal regardless of normal tolerance variations of the sheet metal parts. This requires that the closure member be angularly repositioned in opposite directions to open and close the damper. Thus, a need exists for a simple low cost actuator capable of utilizing a unidirectional motor to rotate a closure member alternately in opposite directions to open and closed positions.

SUMMARY OF THE INVENTION

The present invention is an actuator device in which a first member is mounted for rotation about a first axis between first and second stops which define first and second limiting positions. A second member is also mounted for rotation about the first axis between first and second angular limits, and is coupled to the first meter through a resilient rotary coupler. A third member rotatable member about a second axis and driven by a unidirectional motor is coupled to the second member through a pivotable link, of which first and second opposite ends are connected to the second and third members respectively. The distance between the point of connection of the link to the second member and the first axis is greater than the distance between the point of connection of the link to the third member and the second axis.

The motor is alternately energized through first and second paths which may respectively include first and second limit switches actuated by the second member at its first and second angular limits respectively to interrupt energization to the motor.

DESCRIPTION OF THE PREFERRED EMBODIMENT

Figure 1:
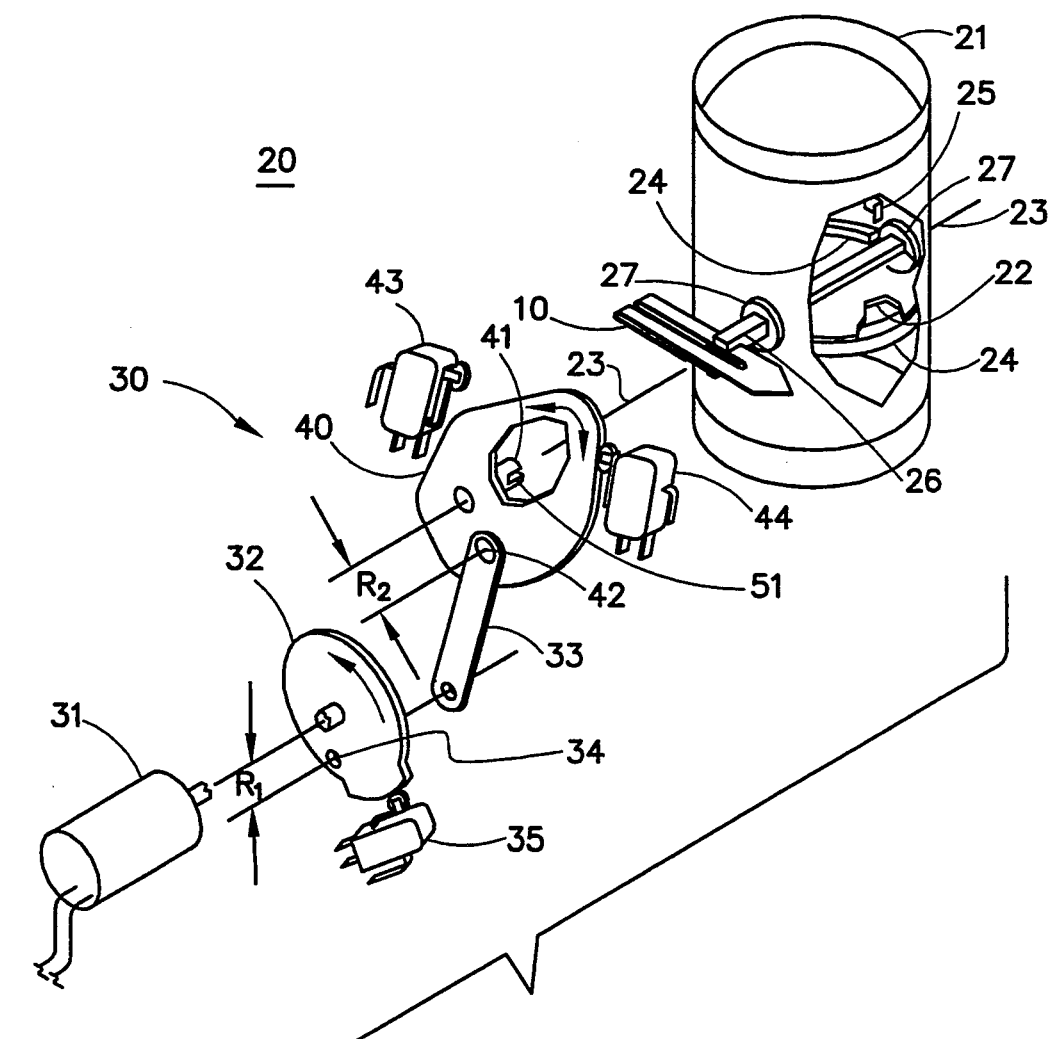
FIG. 1 is an exploded representation, partially broken away, of a vent damper system in accordance with the applicant's invention.

In FIG. 1, reference numeral 20 generally identifies automatic vent damper apparatus for which the applicant's invention has been found particularly advantageous- Vent damper apparatus 20 is intended to be part of a flue system for venting combustion gases from a furnace which operates under thermostatic control. Vent damper apparatus 20 includes a tubular flue section 21 having a planar closure disk 22 therein mounted for rotation about an axis 23 between a closed position as shown in FIG. 1 and an open position in which closure disk 22 is rotated 90° from the position shown in FIG. 1. The purpose of vent damper apparatus 20 is to permit substantially unimpeded flow of combustion gases when the furnace is in operation, while substantially completely precluding flow when the furnace in not in operation. Closure of the flue when the furnace is not in operation prevents heat from escaping from heated by the furnace, thereby resulting in substantial fuel savings.

Prior vent damper arrangements have employed a closure member which rotates in a single direction in 90° steps to achieve alternate opening and closing of the flue. A disadvantage of such an arrangement is that for normal dimensional tolerances of sheet metal parts, the closure member does not provide a tight seal, and thus permits significant leakage when closed. In the arrangement shown in FIG. 1, closure member 20 alternately rotates in opposite directions between its open and closed positions. In its closed position, the periphery of closure disk 22 comes to rest against semicircular stops 24 which form a seal member within flue section 21, thus providing much better control of leakage than prior flue dampers, without requiring tight dimensional tolerances.

In its open position, closure disk 22 comes to rest against a stop 25. Stops 24 and 25 provide precise limiting positions for closure disk 22. In order to achieve optimum performance, closure disk 22 must be rotated to rest firmly against stops 24 and 25.

Closure disk 22 is mounted on a shaft 26 aligned with axis 23 and rotatably carried in the wall of flue section 21 by means of bushings 27. As more clearly illustrated in FIGS. 2 and 3, the end of shaft 26 to which an actuator mechanism generally identified by reference numeral 30 is mechanically coupled is shown with a square cross-section, with the end thereof being bisected by a slot 31.

It would, of course, be possible to use a reversible motor for rotating closure disk 22 between stops 24 and 25. However, reversible motors with attendant power supplies and control systems for achieving reversing operation are undesirably complex and expensive for applications such as the vent damper apparatus of FIG. 1. Accordingly, actuator 30 employs a unidirectional electric motor 31 which is energized by a control circuit when opening or closing of closure disk 22 is desired. The output shaft of motor 31 carries a disk-shaped member 32. A link 33, has one end pivotally connected to member 32 at a pivot point 34 located at a distance $R_1$ from the axis of the motor output shaft. Thus, member 32 and link 33 form a crank arrangement. The periphery of member 32 forms a cam configuration for actuating an electrical switch 35 whose function will be described hereinafter.

A member 40 is carried on a stub shaft 41 mounted for rotation about axis 23. Stub shaft 41 has a slotted end thereon facing the slotted end of shaft 26 for engaging a coupler generally identified by reference numeral 10 in FIG. 1–3. Coupler 10 is described in detail in U.S. patent application Ser. No. 07/998,199 filed Dec. 30, 1992, now abandoned in favor of continuation-in-part U.S. patent application Ser. No. 08/127,673 filed Sept. 28, 1993, in the same of the same inventor as the present application. Member 40 is also pivotally connected to link 33 at the end of the link opposite that pivotally connected to member 32. Pivot point 42 at which link 33 is connected to member 40 is at a distance $R_2$ from axis 23, $R_2$ being greater than $R_1$, so that as member 32 rotates through a complete cycle revolution, member 40 oscillates between two angular limits determined by the relative magnitudes of distances $R_1$ and $R_2$. For purposes of the illustrated vent damper, the apparatus 20 magnitudes of distances $R_1$ and $R_2$ are chosen so that member 40 oscillates through slightly greater than 90°.

The periphery of member 40 is configured with a lobe for actuating electrical limit switches 43 and 44 respectively when member 40 is at its opposite angular limits. Limit switches 43 and 44 serve to interrupt energization of motor 31, as will be described hereinafter, when member 40 is rotated to either of its angular limits.

Figure 2:
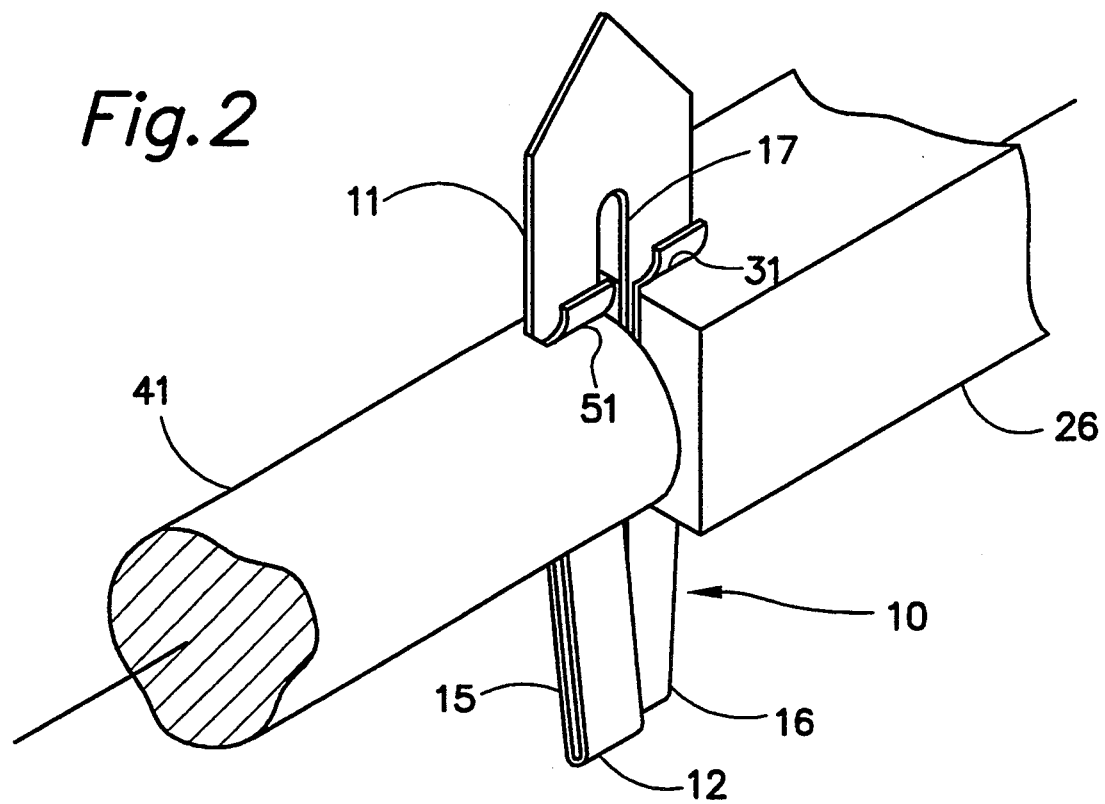
FIG. 2 is an enlarged view of a pair of rotationally coupled coaxial shafts in the vent damper system of FIG. 1, illustrating the configuration of the coupler with a vent closure disk in a first limiting position.
Figure 3:
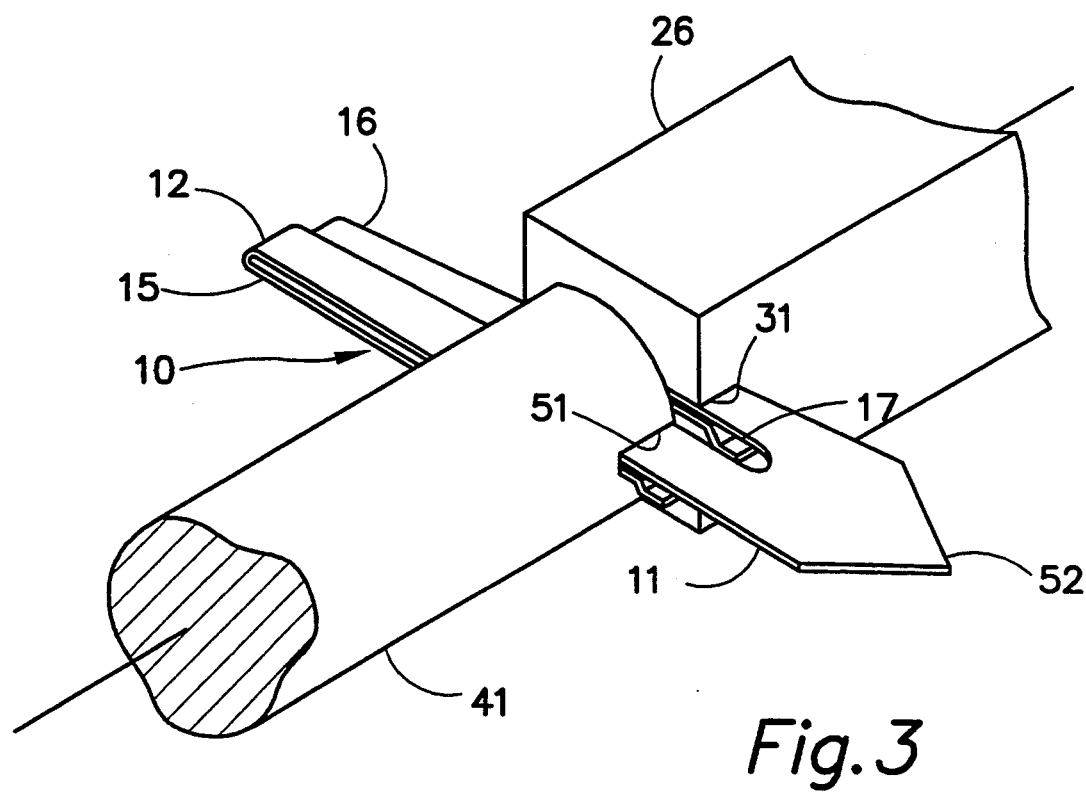
FIG. 3 is a view similar to that of FIG. 2 illustrating the configuration of the coupler with the vent closure disk in its opposite limiting position.

As illustrated in FIGS. 1–3, shafts 26 and 41 are rotationally coupled by means of coupler 10 which engages slot 31 in the end of shaft 26 and corresponding slot 51 in the end of shaft 41. Slots 31 and 51 each have a width slightly greater than twice the thickness of strip material 11 from which coupler 10 is formed. Strip 11 is folded into a V-shape at a region 12, and separated into V-shaped legs 15 and 16 by a longitudinal slit 17. Coupler 10 is installed by compressing the portions of V-shaped legs 15 and 16 so that the legs can be inserted into slots 51 and 31 respectively. Since the portions of each V-shaped leg are urged apart by the resilience of the strip material, coupler 10 provides a backlash free coupling of shafts 26 and 41.

Coupler 10 also serves to permit limited overtravel of shaft 41 with respect to shaft 26, as illustrated in FIGS. 2 and 3. Because of the configuration of coupler 10, legs 15 and 16 are permitted to flex with respect to one another. The stiffness of this flexure is determined by the properties and thickness of the material of strip 11, the distance between the end of slit 17 and the edge of shafts 26 and 41, and the width of each of legs 15 and 16. Thus, the torque transmitted during overtravel of shaft 41 can be easily controlled by varying the noted dimensions.

Figure 4:
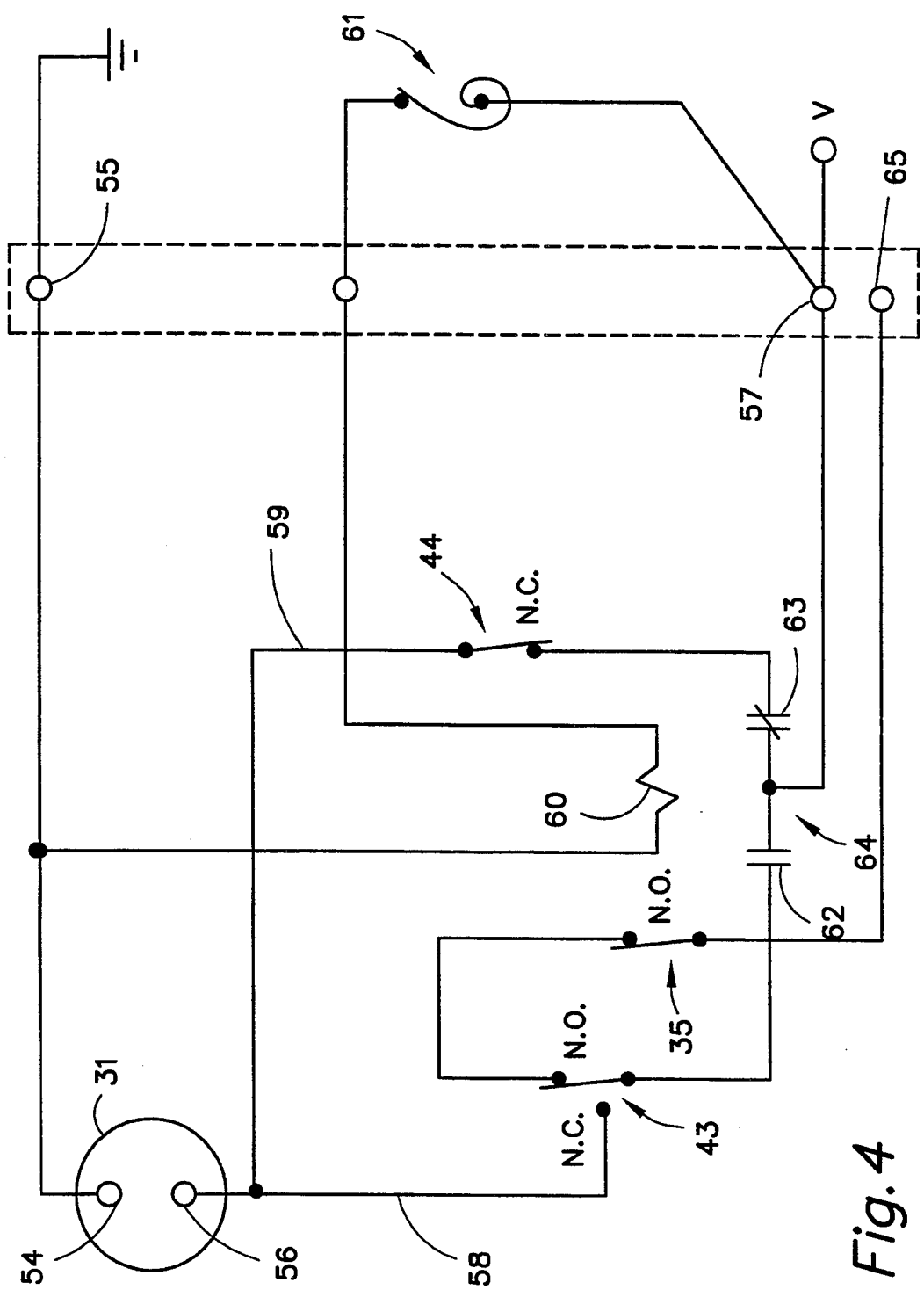
FIG. 4 is a schematic diagram of an electrical circuit for energizing the motor in the vent damper system of FIG. 1 to alternately rotationally reposition the vent closure disk in opposite directions.

In the schematic diagram of FIG. 4 reference numerals 31, 35, 43 and 44 identify the schematic equivalents of the same elements illustrated in FIG. 1.

Motor 31 includes a first electrical terminal 54 connected to a first electrical power terminal 55 shown maintained at a reference potential or electric ground. Motor 31 also has a second terminal 56 which may receive electrical current from a power terminal 57 at a voltage different than the electrical ground. Depending on the position of member 40 in FIG. 1 and consequent states of switches 43 and 44 and an electrical relay identified by reference numeral 64, electrical energization is supplied to terminal 56 through either a first circuit path identified by reference numeral 58 or a second circuit path identified by reference numeral 59, circuit paths 58 and 59 containing switches 43 and 44 respectively. Relay 64, which includes a coil 60, is controlled by a thermostat 61, coil 60 and thermostat 61 being connected in series between power terminals 55 and 57.

In operation, assuming that thermostat 61 is sensing a condition which calls for operation of the furnace system of which vent damper apparatus 20 is a part, the thermostat closes the electrical circuit through relay coil 60, which causes its normally open contacts 62 to close and its normally closed contacts 63 to open. Further, assuming that closure disk 22 and member 40 are in their clockwise limiting position, as they normally would be just prior to the time furnace operation is called for, the normally closed (N.C.) contacts of switch 43 are closed and energization is supplied to motor 31 through path 58. As a result, motor 31, operating through connecting link 33, causes member 40 to rotate in the counterclockwise direction, thereby opening closure disk 22. This operation continue until the lobe on member 40 actuates switch 43, causing it to break continuity through the normally closed contacts of the switch, and coincidentally causing it to create continuity through normally open (N. O.) contacts of the switch for purposes which will be described hereinafter. At the time continuity through the normally closed contacts of switch 43 is broken, energization to motor 31 is interrupted and closure disk 22 and member 40 remain in their counterclockwise limiting positions.

At such time as thermostat 61 is satisfied, electrical continuity therethrough is broken, thus deenergizing relay 64 and thereby opening contacts 62 and closing contacts 63. Since member 40 is in its counterclockwise position, switch 44 is unactuated and electrical continuity is provided therethrough, thus energizing motor 31 through contacts 63 and switch 44. Accordingly, motor 31, acting through link 33, causes member 40 to rotate in a clockwise direction until the lobe on member 40 actuates switch 44, thus breaking electrical continuity therethrough and deenergizing motor 31. In this position, closure disk 22 is positioned firmly against stops 24, thus preventing flow through flue section 21. Rotation of member 40 in a clockwise direction causes switch 43 to return to its unactuated state in which there is electrical continuity through the normally closed contacts. However, since contacts 62 in relay 64 are open, no energization is supplied to motor 31.

Switch 43 through its normally open contacts, and switch 35 provide a path through which electrical power can be supplied to a burner ignition system in the furnace, the burner ignitions system being connected to a terminal 65. For safety reasons, it is imperative that closure disk 22 in flue section 21 be open any time the burner is in operation. Switches 35 and 43 provide a redundant safety circuit for this operation. In particular, energization will not be provided at terminal 65 unless normally open switch 35 is actuated by a cam lobe on the periphery of member 32 which is positioned to actuate switch 35 only when switch 43 is being actuated by the lobe on member 40. Thus, even though one of switches 35 and 43 fails in a position to provide electrical continuity therethrough, the other switch precludes energization of terminal 65 when the vent damper is closed.

In accordance with the foregoing discussion, the applicant has provided a unique, simple, inexpensive automatic vent damper with superior performance characteristics. Although a particular embodiment has been shown and described in detail for illustrative purposes, coverage is not to be limited to the disclosed embodiment, but only by the terms of the following claims.

The embodiments of the invention in which an exclusive property or right is claimed are defined as follows:

1. Apparatus utilizing a unidirectional motor for alternately rotating a member in opposite directions to alternately position said member at first and second positions, comprising:
   a first member mounted for rotation about a first axis;
   first and second stops positioned to limit rotation of said first member about the first axis, said first and second stops defining first and second limiting positions for said first member and defining a first angle through which said first member is permitted to rotate;
   a second member mounted for rotation about a second axis,
   a motor coupled to said second member and operable, when energized, to rotate said second member in a single direction only;
   a third member mounted for rotation about the first axis;
   a couple resiliently connecting said first and third member, and adapted to transfer torque about the first axis between the first and third members, while permitting said third member to rotate through a second angle greater than the first angle;
   a connecting link joining said second and third member, said connecting link being pivotally connected to said second and third members at first and second locations respectively, the distance between the first axis and second location being greater than the distance between the second axis and first location; and
   switch means through which energization can be supplied to said motor, said switch means being operable to interrupt energization to said motor substantially at the time said first member is rotated to either of said first and second stops.

2. The apparatus of claim 1 wherein said switch means is adapted for actuation by said third member.

3. The apparatus of claim 2 wherein said switch means includes first and second energization paths through which energization is alternately supplied to said motor.

4. The apparatus of claim 3 wherein:
   said motor is an electric motor;
   said switch means includes first, second and third electrical switching devices, said first and third switching devices each having common, normally open and normally closed terminals, each of said first and third switching devices, when actuated, providing electrical continuity between its common and normally open terminals and no electrical continuity between its common and normally closed terminals, said second switching device having common and normally closed terminals, said second switching device, when actuated, breaking electrical continuity between its common and normally closed terminals;
   connecting means interconnecting said first, second and third electrical switching devices so that the normally open and normally closed terminals of said third switching device respectively are connected to an energization terminal of said motor through the normally closed terminals of said first and second switching devices; and
   said first and second switching devices are adapted to be actuated by said third member when said first member is rotated to its second and first stops respectively.

5. The apparatus of claim 4 wherein:
   said first and third member respectively include first and second substantially coaxial shafts, each shaft having a slotted end proximate the slotted end of the other shaft; and
   said coupler comprises an elongated strip of resilient material having a slit along the length thereof extending from a first end to a region near a second end opposite the first end, the slit dividing the strip into first and second elongated legs, said strip further being folded on itself along a line transverse to the slit and intermediate the first and second ends so that the first and second legs are each formed into a V-shape, the first and second legs being positioned in the slots in the shafts of said first and third members respectively.

6. The apparatus of claim 5 wherein:
   said first member is a planar closure member in a tubular duct, the first axis intersecting the duct substantially perpendicular to the fluid flow path therethrough;
   said first stop is a seal member internal to the duct around the periphery thereof, said seal member being configured so that when said closure member is in a closed position it comes to rest against said first stop along substantially its entire perimeter; and
   said second stop is positioned to allow said closure member to rotate substantially 90° about the first axis from its position against said first stop.

7. The apparatus of claim 6 wherein: the common terminal of said third switching device is connected to a source of electric current; and said third switching device is an electrical relay adapted to be actuated by a thermostatic control device when said thermostatic control device senses a low temperature.

* * * * *

UNITED STATES PATENT AND TRADEMARK OFFICE
CERTIFICATE OF CORRECTION

PATENT NO. : 5,363,025
DATED : November 8, 1994
INVENTOR(S) : George J. Colling

It is certified that error appears in the above-indentified patent and that said Letters Patent is hereby corrected as shown below:

Column 5, line 24, cancel "couple" and substitute --coupler--;

line 25, cancel "member" and substitute --members--;

lines 29-30, cancel "member" and substitute --members--;

Column 6, line 19, cancel "member" and substitute --members--;

lines 49-54, reformat claim 7 as follows:

UNITED STATES PATENT AND TRADEMARK OFFICE
CERTIFICATE OF CORRECTION

PATENT NO. : 5,363,025
DATED : November 8, 1994
INVENTOR(S) : George J. Colling

It is certified that error appears in the above-indentified patent and that said Letters Patent is hereby corrected as shown below:

--7. The apparatus of claim 6 wherein:
  the common terminal of said third switching device is connected to a source of electric current; and
  said third switching device is an electrical relay adapted to be actuated by a thermostatic control device when said thermostatic control device senses a low temperature.--

Signed and Sealed this

Seventeenth Day of January, 1995

Attest:

BRUCE LEHMAN

*Attesting Officer*     *Commissioner of Patents and Trademarks*